US008930068B1

(12) United States Patent  
Helder et al.

(10) Patent No.: US 8,930,068 B1  
(45) Date of Patent: Jan. 6, 2015

(54) SYSTEM AND METHOD FOR MANAGING INSTANCES OF DAMAGE WITHIN A TRANSPORTATION SYSTEM (71) Applicant: American Airlines, Inc., Fort Worth, TX (US)

(72) Inventors: Drew Douglas Helder, Fort Worth, TX (US); Cesar Ongaro Silva, Euless, TX (US)

(73) Assignee: American Airlines, Inc., Fort Worth, TX (US)

( * ) Notice: Subject to any disclaimer, the term of this patent is extended or adjusted under 35 U.S.C. 154(b) by 0 days.

(21) Appl. No.: 13/942,292

(22) Filed: Jul. 15, 2013

(51) Int. Cl.  
G06F 17/30 (2006.01)  
B64F 5/00 (2006.01)

(52) U.S. Cl.  
CPC .................................. B64F 5/0081 (2013.01)  
USPC .......... 701/34; 701/29.1; 701/29.6; 701/31.6; 701/32.7; 701/34.2; 707/609; 707/790

(58) Field of Classification Search  
CPC .................................. G07C 5/00; G07C 5/008  
See application file for complete search history.

(56) References Cited

U.S. PATENT DOCUMENTS

| 4,816,828 | A | * | 3/1989 | Feher | 340/945 |
| 5,828,969 | A | * | 10/1998 | Chamney et al. | 702/35 |
| 6,067,486 | A | * | 5/2000 | Aragones et al. | 701/29.6 |
| 6,567,729 | B2 | * | 5/2003 | Betters et al. | 701/31.5 |
| 6,671,593 | B2 | * | 12/2003 | Sinex | 701/29.4 |
| 6,691,006 | B2 | * | 2/2004 | Sinex | 701/29.4 |
| 6,714,846 | B2 | * | 3/2004 | Trsar et al. | 701/34.3 |
| 6,795,758 | B2 | * | 9/2004 | Sinex | 701/29.4 |
| 6,868,319 | B2 | * | 3/2005 | Kipersztok et al. | 702/185 |
| 6,885,921 | B1 | * | 4/2005 | Farmer | 701/29.1 |
| 7,050,894 | B2 | * | 5/2006 | Halm et al. | 701/29.4 |
| 7,167,786 | B2 | * | 1/2007 | Sinex | 701/29.4 |
| 7,702,435 | B2 | * | 4/2010 | Pereira et al. | 701/30.8 |
| 7,802,204 | B2 | * | 9/2010 | Merry et al. | 715/846 |
| 8,082,317 | B2 | * | 12/2011 | Loda | 709/217 |
| 8,090,462 | B2 | * | 1/2012 | Wininger et al. | 700/100 |
| 8,195,535 | B2 | * | 6/2012 | Nagalla et al. | 705/29 |
| 8,321,083 | B2 | * | 11/2012 | Beebe et al. | 701/29.1 |
| 8,335,601 | B2 | * | 12/2012 | Sham et al. | 701/3 |
| 8,356,244 | B2 | * | 1/2013 | Vandermolen et al. | 715/230 |
| 8,380,385 | B2 | * | 2/2013 | Yukawa et al. | 701/24 |
| 8,560,368 | B1 | * | 10/2013 | Maity et al. | 705/7.13 |
| 8,571,747 | B2 | * | 10/2013 | Zimpfer et al. | 701/29.1 |
| 8,670,893 | B2 | * | 3/2014 | Geddam et al. | 701/29.3 |
| 2001/0032110 | A1 | * | 10/2001 | Sinex | 705/8 |

(Continued)

OTHER PUBLICATIONS http://www.aircraftit.com/MRO/Vendors/TRAX/Modules/Technical-Records.aspx (2 pages) retrieved Feb. 12, 2013.

(Continued)

Primary Examiner — Jonathan M Dager  
(74) Attorney, Agent, or Firm — Haynes and Boone, LLP (57) ABSTRACT A system and method according to which data associated with a damage log is received, the damage log being associated with an instance of damage to a portion of a vehicle such as, for example, a portion of an aircraft. A graphical representation of the portion of the vehicle is outputted, and a graphical damage indicator is outputted. The graphical damage indicator is located, relative to the graphical representation of the portion of the vehicle, to indicate a location of the instance of damage on the portion of the vehicle. The graphical damage indicator visually represents a type of damage to the vehicle.

20 Claims, 9 Drawing Sheets

(56) References Cited

U.S. PATENT DOCUMENTS

| | | | |
|---|---|---|---|
| 2002/0033946 A1* | 3/2002 | Thompson | 356/394 |
| 2002/0122583 A1* | 9/2002 | Thompson | 382/141 |
| 2002/0138184 A1* | 9/2002 | Kipersztok et al. | 701/29 |
| 2003/0083794 A1* | 5/2003 | Halm et al. | 701/29 |
| 2003/0109973 A1* | 6/2003 | Hensey et al. | 701/35 |
| 2003/0195675 A1* | 10/2003 | Felke et al. | 701/29 |
| 2003/0233178 A1* | 12/2003 | Sinex | 701/29 |
| 2004/0162651 A1* | 8/2004 | Halm et al. | 701/29 |
| 2004/0162811 A1* | 8/2004 | Wetzer et al. | 707/2 |
| 2005/0216139 A1* | 9/2005 | Laughlin et al. | 701/3 |
| 2005/0240555 A1* | 10/2005 | Wilde et al. | 707/1 |
| 2006/0069520 A1* | 3/2006 | Gorinevsky et al. | 702/36 |
| 2006/0144997 A1* | 7/2006 | Schmidt et al. | 244/100 R |
| 2006/0259217 A1* | 11/2006 | Gorinevsky et al. | 701/29 |
| 2007/0010923 A1* | 1/2007 | Rouyre | 701/29 |
| 2008/0005617 A1* | 1/2008 | Maggiore et al. | 714/30 |
| 2008/0301152 A1* | 12/2008 | Kollgaard et al. | 707/10 |
| 2009/0157532 A1* | 6/2009 | Shiner et al. | 705/28 |
| 2012/0053784 A1* | 3/2012 | Schmidt et al. | 701/33.4 |
| 2012/0319706 A1* | 12/2012 | Nadel et al. | 324/679 |
| 2013/0166458 A1* | 6/2013 | Wallner et al. | 705/305 |
| 2013/0168499 A1* | 7/2013 | Grossman | 244/135 A |

OTHER PUBLICATIONS

Trax, "Proven MRO Solutions", brochure, 5 pages, date unknown.

* cited by examiner

SYSTEM AND METHOD FOR MANAGING INSTANCES OF DAMAGE WITHIN A TRANSPORTATION SYSTEM

BACKGROUND

The present disclosure relates in general to a system and method for managing instances of damage to vehicles and associated repairs within a transportation system such as, for example, air, land or sea transportation systems, and in particular to a system and method for managing instances of damage and associated repairs using graphical representations of vehicles, as well as visual indicators representing the instances of damage in relation to the graphical representation of vehicles.

BRIEF SUMMARY OF THE INVENTION

A method that includes receiving, using at least one computer, data associated with a damage log, the damage log being associated with an instance of damage to a portion of an aircraft, the portion of the aircraft being one of a randome, a forward fuselage, a center fuselage, a wing, a winglet, a rear fuselage, a tail cone, a silencer, a pylon, an engine intake, a nacelle, a vertical stabilizer, and a horizontal stabilizer. The method also includes outputting, using the at least one computer, a graphical representation of the portion of the aircraft and outputting, using the at least one computer, a graphical damage indicator. In addition, the method includes receiving, using the at least one computer, data associated with a plurality of damage logs, each damage log from the plurality of damage logs being associated with one instance of damage located on the portion of the aircraft. The data associated with the first-mentioned damage log is part of the data associated with the plurality of damage logs. The method also includes outputting, using the at least one computer, a plurality of graphical damage indicators, each graphical damage indicator being associated with a respective one of the damage logs from the plurality of damage logs, and visually representing a type of damage. The first-mentioned graphical damage indicator is part of the plurality of graphical damage indicators. The graphical damage indicator is located, relative to the graphical representation of the portion of the aircraft, to indicate a location of the instance of damage on the portion of the aircraft, and the graphical damage indicator visually represents a type of damage to the aircraft.

An apparatus that includes a non-transitory computer readable medium and a plurality of instructions stored on the non-transitory computer readable medium and executable by one or more processors. The plurality of instructions includes instructions that cause the one or more processors to receive data associated with a damage log, the damage log being associated with an instance of damage to a portion of an aircraft, the portion of the aircraft being one of: a randome, a forward fuselage, a center fuselage, a wing, a winglet, a rear fuselage, a tail cone, a silencer, a pylon, an engine intake, a nacelle, a vertical stabilizer, and a horizontal stabilizer. The plurality of instructions also include instructions that cause the one or more processors to output a graphical representation of the portion of the aircraft, instructions that cause the one or more processors to output a graphical damage indicator, and instructions that cause the one or more processors to receive data associated with a plurality of damage logs, each damage log from the plurality of damage logs being associated with one instance of damage located on the portion of the aircraft, wherein the data associated with the first-mentioned damage log is part of the data associated with the plurality of damage logs. The plurality of instructions also include instructions that cause the one or more processors to output a plurality of graphical damage indicators, each graphical damage indicator being associated with a respective one of the damage logs from the plurality of damage logs and visually representing a type of damage, wherein the first-mentioned graphical damage indicator is part of the plurality of graphical damage indicators. The graphical damage indicator is located, relative to the graphical representation of the portion of the aircraft, to indicate a location of the instance of damage on the portion of the aircraft, and the graphical damage indicator visually represents a type of damage to the aircraft.

DETAILED DESCRIPTION

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
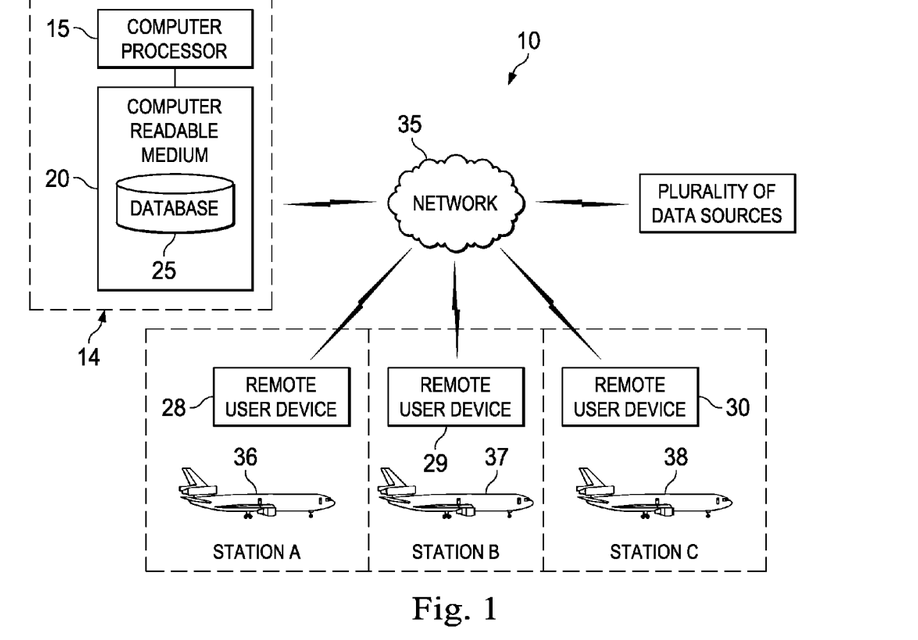
FIG. 1 is a diagrammatic illustration of a system according to an exemplary embodiment, the system including a remote user device.

In an exemplary embodiment, as illustrated in FIG. 1, a system is generally referred to by the reference numeral 10 and includes a functional module 14, which includes a computer processor 15 and a computer readable medium 20 operably coupled thereto. Instructions accessible to, and executable by, the computer processor 15 are stored on the computer readable medium 20. A database 25 is also stored in the computer readable medium 20. A plurality of remote user devices, including remote user devices 28, 29, and 30, are operably coupled to, and in communication with, the functional module 14 via a network 35. In one embodiment, each of the remote user devices 28, 29, and 30 is associated with a location, such as a station, at which a vehicle from a plurality of vehicles could be parked. For example, the remote user device 28 is associated with the station A, at which vehicle 36 is parked, the remote user device 29 is associated with the station B, at which vehicle 37 is parked, and the remote user device 30 is associated with station C, at which vehicle 38 is parked. In one embodiment, the remote user device 30 receives data relating to a transportation system. In one embodiment, a transportation system includes a plurality of vehicles and a plurality of stations, with each vehicle capable of being parked at least one of the stations from the plurality of stations. In one embodiment the remote user devices 28, 29, and 30 receive data relating to the vehicles 36, 37, and 38, respectively. Instances of damage, such as an abrasion, a scratch, a dent, a crack, a gouge, a puncture, an abrasion, corrosion, and delamination, often occur to the vehicles 36, 37, and 38. In one embodiment, the system 10 receives damage-related data associated with the plurality of vehicles. In several embodiments, by receiving damage-related data from the remote user devices 28, 29, and 30, the system 10 manages instances of damage to, and associated repairs of, each of the vehicles 36, 37, and 38 within the transportation system. In several exemplary embodiments, as shown in FIG. 1, each of the vehicles 36, 37 and 38 is an aircraft.

In an exemplary embodiment, the functional module 14 is a web application server, which in several exemplary embodiments includes and/or executes one or more web-based programs, Intranet-based programs, and/or any combination thereof. In an exemplary embodiment, the network 35 includes the Internet, one or more local area networks, one or more wide area networks, one or more cellular networks, one or more wireless networks, one or more voice networks, one or more data networks, one or more communication systems, and/or any combination thereof.

Figure 2:
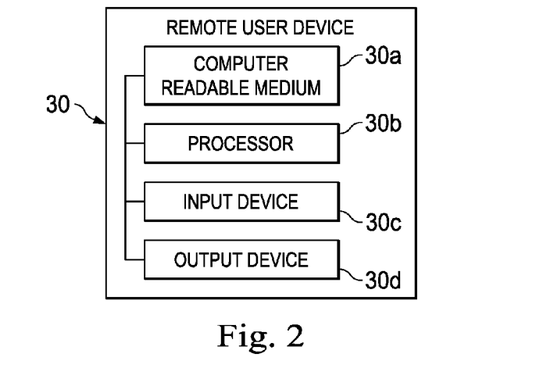
FIG. 2 is a diagrammatic illustration of the remote user device of FIG. 1, according to an exemplary embodiment, the remote user device including an output device.

In an exemplary embodiment, as illustrated in FIG. 2 with continuing reference to FIG. 1, the remote user device 30 includes a computer readable medium 30a, a processor 30b, an input device 30c, and an output device 30d. In an exemplary embodiment, instructions accessible to, and executable by, the processor 30b are stored in the computer readable medium 30a. In an exemplary embodiment, web browser software is stored in the computer readable medium 30a. In an exemplary embodiment, the input device 30c and the output device 30d include a graphical display, which, in several exemplary embodiments, is in the form of, or includes, one or more digital displays, one or more liquid crystal displays, one or more cathode ray tube monitors, and/or any combination thereof. In an exemplary embodiment, the output device 30d includes a graphical display, a printer, a plotter, and/or any combination thereof. In an exemplary embodiment, the input device 30c is the output device 30d, and the output device 30d is the input device 30c.

In several exemplary embodiments, the remote user device 30 is a thin client and the functional module 14 controls at least a portion of the operation of the remote user device 30. In several exemplary embodiments, the remote user device 30 is a thick client. In several exemplary embodiments, the remote user device 30 functions as both a thin client and a thick client. In several exemplary embodiments, the remote user device 30 is, or includes, a telephone, a personal computer, a personal digital assistant, a cellular telephone, other types of telecommunications devices, other types of computing devices, and/or any combination thereof. In several exemplary embodiments, the remote user device 30 includes a plurality of remote user devices. In several exemplary embodiments, the remote user device 30 is, or at least includes, one or more of the functional module 14, the computer processor 15, the computer readable medium 20, the database 25 and/or any combination thereof.

In an exemplary embodiment, the system 10 includes a computer program including a plurality of instructions, data, and/or any combination thereof. In an exemplary embodiment, the system 10 is an application written in, for example, HyperText Markup Language (HTML), Cascading Style Sheets (CSS), JavaScript, Extensible Markup Language (XML), asynchronous JavaScript and XML (Ajax), and/or any combination thereof. In an exemplary embodiment, the system 10 is a web-based application written in, for example, Java or Adobe Flash, which pulls real-time information from the remote user device 30, the functional module 14, and/or the plurality of data sources. In an exemplary embodiment, the system 10 pulls real-time information from the remote user device 30, the functional module 14, and/or the plurality of data sources, upon the execution, opening or start-up of the system 10. In an exemplary embodiment, the system 10 is a web-based application written in, for example, Java or Adobe Flash, which pulls real-time information from the remote user device 30, the functional module 14, and/or the plurality of data sources, automatically refreshing with latest information every, for example, 45 seconds.

Figure 3A:
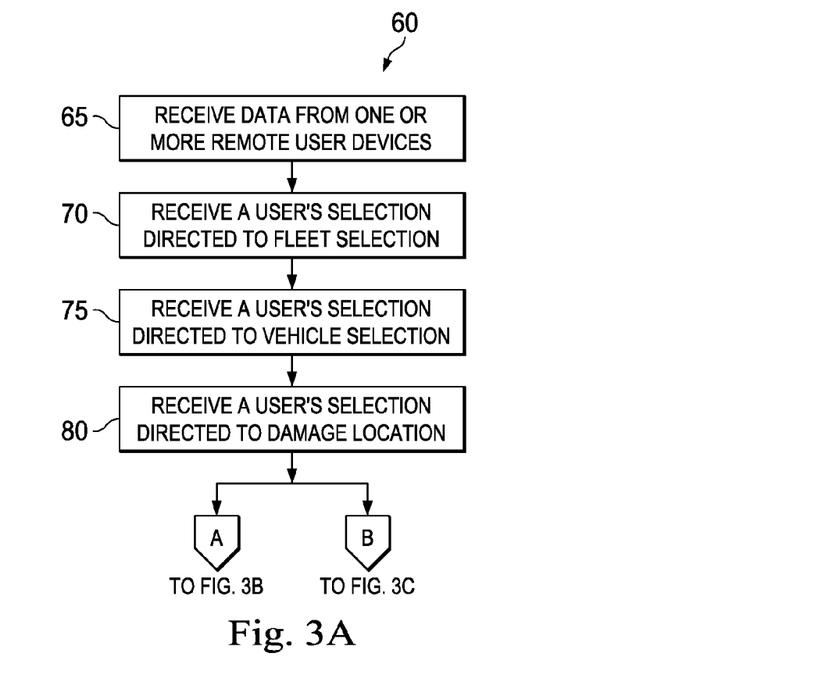
FIGS. 3A, 3B, and 3C are flow chart illustrations of a method of operating the system of FIG. 1, according to an exemplary embodiment.
Figure 3B:
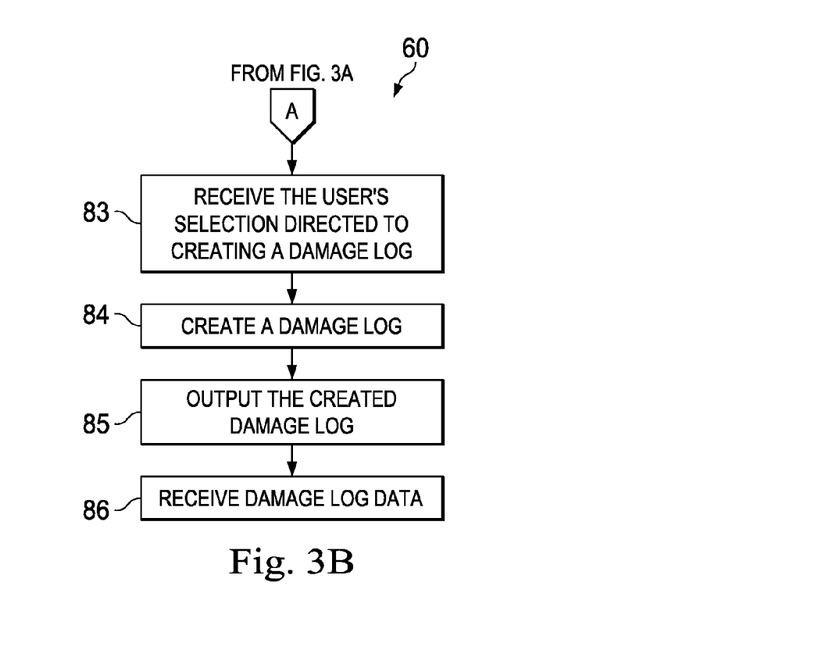
Figure 3C:
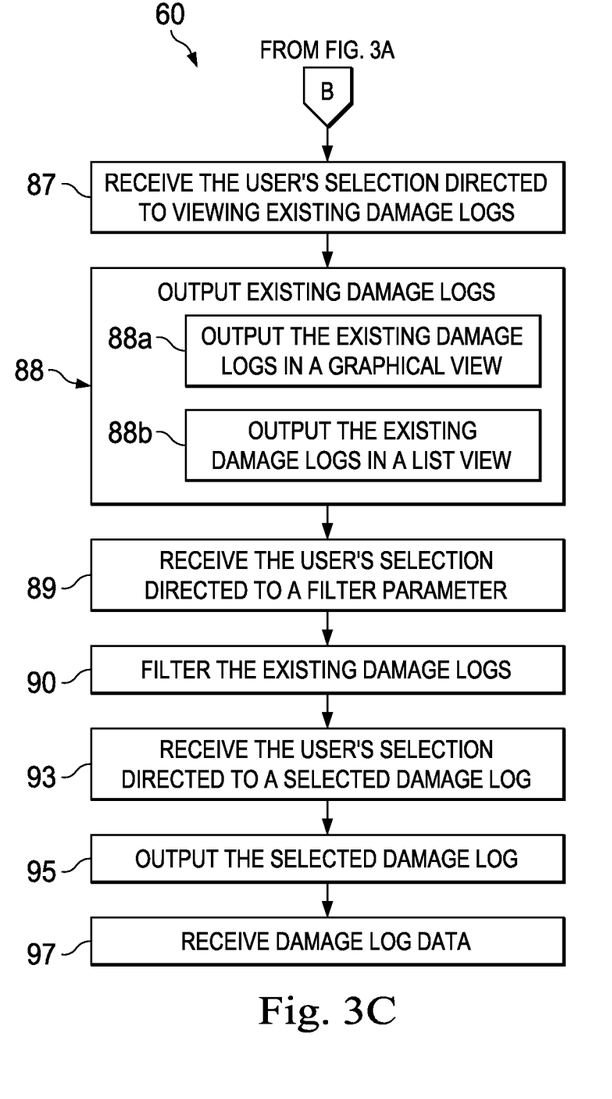

In an exemplary embodiment, as illustrated in FIGS. 3A, 3B, 3C, 4, 5, 6, 7 and 8 with continuing reference to FIGS. 1 and 2, a method of operating the system 10 is generally referred to by the reference numeral 60. In one embodiment, as shown in FIG. 3A, the method 60 includes receiving data from one or more remote user devices at step 65, receiving a user's selection directed to fleet selection at step 70, receiving the user's selection directed to vehicle selection at step 75, and receiving the user's selection directed to damage location at step 80. As shown in FIG. 3B, the method 60 includes receiving the user's selection directed to creating a damage log at step 83, creating a damage log at step 84, outputting the created damage log data at step 85, and receiving damage log data at step 86. Alternatively, as shown in FIG. 3C, after the step 80, the method 60 includes receiving the user's selection directed to viewing existing damage logs at step 87, outputting existing damage logs at step 88, receiving the user's selection directed to a filter parameter at step 89, filtering the existing damage logs at step 90, receiving the user's selection directed to a selected damage log at step 93, outputting the selected damage log at step 95, and receiving damage log data at step 97.

In an exemplary embodiment, as shown in FIG. 3A, the system 10 receives data at the step 65. In one embodiment, the data includes aircraft damage log data, damage data, interim action data, permanent repair data, work order data, reference document data, and photograph data. In one embodiment, the interim action data and permanent repair data are associated with action items. In one embodiment, the system 10 receives the data from one or more of the following: the remote user devices 28, 29, and 30 and the plurality of data sources. In one embodiment, the plurality of data sources includes a dispatch environmental control system (DECS) and/or one or more computer systems, host-based systems and/or applications thereof; the Federal Aviation Administration (FAA) and/or one or more computer systems, host-based systems and/or applications thereof; off-schedule operations (OSO) and/or one or more computer systems, host-based systems and/or applications thereof; a flight operating system (FOS) and/or one or more computer systems, host-based systems and/or applications thereof, and an aircraft communication addressing and reporting system (ACARS) and/or one or more computer systems, host-based systems and/or applications thereof.

Figure 4:
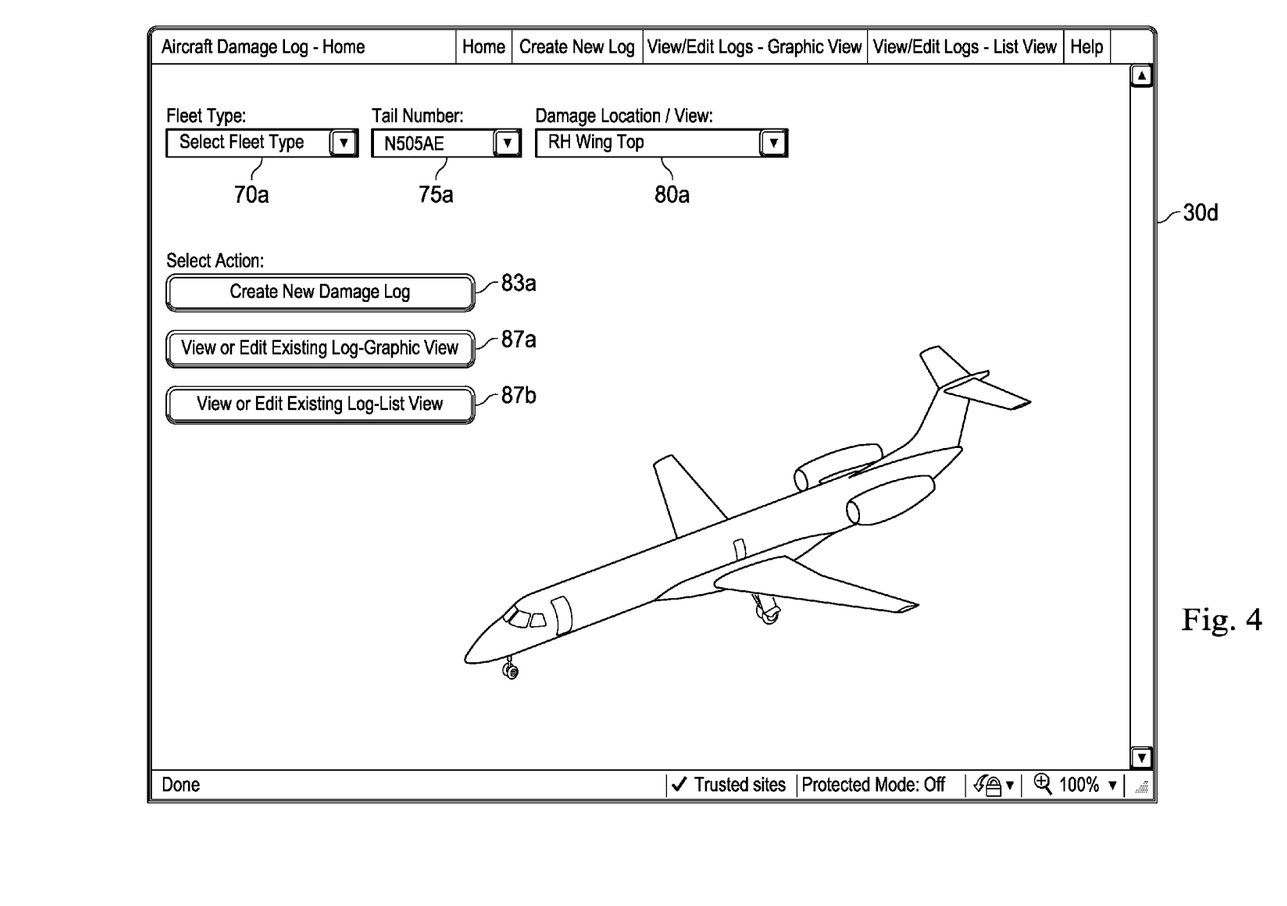
FIGS. 4-8 are different diagrammatic illustrations of the output device of FIG. 2 during the execution of the method of FIGS. 3A, 3B and 3C, according to an exemplary embodiment.

Before, during or after the step 65, the system 10 receives the user's selection directed to fleet type at the step 70. In one embodiment, the system 10 uses the output device 30d and/or the input device 30c to receive fleet type selection parameters, as shown in FIG. 4. In one embodiment, the system 10 receives the user's selection directed to fleet type using a "drop-down" menu 70a, or may be received using a text-entry box or selection box (not shown). In one embodiment, the user selects a fleet type parameter from the "drop-down" menu 70a. In one embodiment, the fleet type parameter is associated with different types of fleets, such as CRJ700, etc.

Before, during or after the step 70, the system 10 receives the user's selection directed to vehicle selection at the step 75. In one embodiment, the system 10 receives the user's selection directed to vehicle selection using a "drop-down" menu 75*a*, or may be received using a text-entry box or selection box (not shown). In one embodiment, the user selects a vehicle parameter from the "drop-down" menu 75*a*. In one embodiment, the vehicle parameter, such as a tail number, is associated with a specific vehicle. In one embodiment, receiving the user's selection directed to vehicle selection results in the system 10 identifying a selected vehicle, with the selected vehicle being associated with the vehicle parameter selected by the user.

Before, during or after the step 75, the system 10 receives the user's selection directed to damage location at the step 80. In one embodiment, the system 10 uses the output device 30*d* and/or the input device 30*c* to receive the user's selection directed to damage location at the step 80. In one embodiment, the system 10 receives the user's selection directed to vehicle selection using a "drop-down" menu 80*a*, or may be received using a text-entry box or selection box (not shown). In one embodiment, the user selects a damage location parameter from the "drop-down" menu 80*a*. In one embodiment, each damage location parameter is associated with a portion of the selected vehicle, or selected aircraft. In one embodiment, the damage location parameters include a right randome, a left randome, a right forward fuselage, a left forward fuselage, a right center fuselage, a left center fuselage, a right wing (top and bottom), a left wing (top and bottom), a right winglet (top and bottom), a left winglet (top and bottom), a right rear fuselage, a left rear fuselage, a right tail cone, a left tail cone, a right APU silencer, a left APU silencer, a right pylon (top and bottom), a left pylon (top and bottom), a right engine intake, a left engine intake, a right nacelle (top, inboard, outboard, and bottom), a left nacelle (top, inboard, outboard, and bottom), a right vertical stabilizer, a left vertical stabilizer, a right horizontal stabilizer (top and bottom), and a left horizontal stabilizer (top and bottom). After the step 80, the next step is either the step 83 of FIG. 3B or the step 87 of FIG. 3C.

As shown in FIG. 3B, before, during or after the step 80, the system 10 receives the user's selection directed to creating a damage log at the step 83. In one embodiment, a damage log is a record associated with a singular instance of damage to the selected aircraft. In one embodiment, the system 10 uses the output device 30*d* and/or the input device 30*c* to receive the user's selection directed to creating a damage log. In one embodiment, the system 10 receives the user's selection directed to creating a damage log using a "link" 83*a*, or may be received using a selection box (not shown). In one embodiment, the vehicle or aircraft 38 may be parked at the station C, and the user may create a damage log after finding an instance of damage during a routine maintenance check.

Before, during or after the step 83, the system 10 creates a damage log at the step 84.

Figure 5:
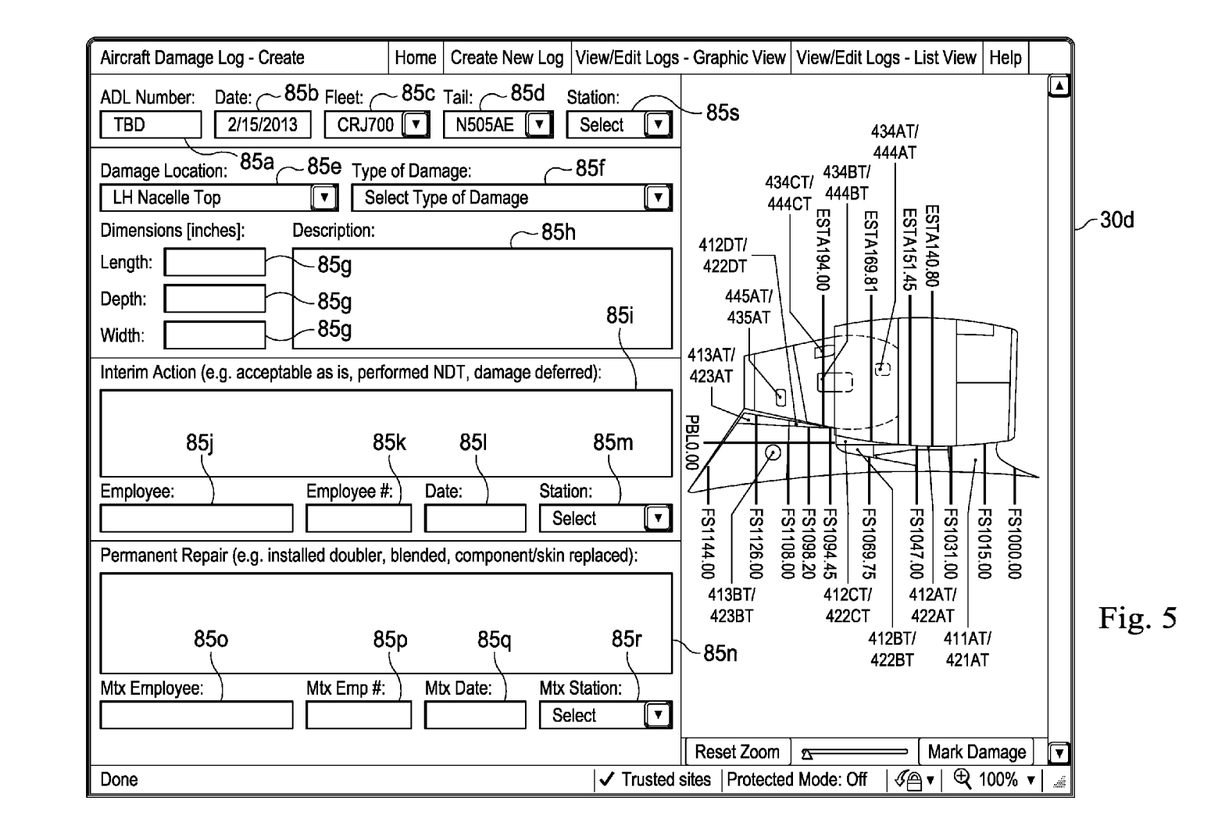

Before, during or after the step 84, the system 10 outputs the created damage log at the step 85. In one embodiment, the system 10 uses the output device 30*d* and/or the input device 30*c* to output the created damage log. In one embodiment, the created damage log includes entry fields capable of accepting a wide variety of data. In one embodiment, as shown in FIG. 5, the system 10 outputs an entry field for a damage log number 85*a*, an entry field for a date 85*b*, an entry field for a fleet number 85*c*, an entry field for an aircraft tail number 85*d*, an entry field for a damage location 85*e*, an entry field for the type of damage 85*f*, an entry field for dimensions of the damage 85*g*, an entry field for a description of the damage 85*h*, an entry field for an interim action description 85*i*, an entry field for an employee name 85*j* and an entry field for employee number 85*k* that is associated with the interim action, an entry field for date 85*l* associated with the interim action, and an entry field for station 85*m* association with interim action; an entry field for a permanent repair description 85*n*, an entry field for an employee name 85*o* and an entry field for an employee number 85*p* that is associated with the permanent repair data, an entry field for a date associated with permanent repair 85*q*, an entry field for a station 85*r* associated with permanent repair, and an entry field for a station 85*s*.

Referring back to FIG. 3B, before, during, or after the step 85, the system 10 receives damage log data at the step 86. In one embodiment, the system 10 receives the damage log data using the entry fields 85*a*-85*s* of FIG. 5. In one embodiment, the damage log data is the data associated with the entry fields 85*a*-85*s* of FIG. 5.

As shown in FIG. 3C, before, during or after the step 80, the system 10 receives the user's selection directed to viewing existing damage logs at the step 87. In one embodiment, the system 10 uses the output device 30*d* and/or the input device 30*c* to receive the user's selection directed to viewing existing damage logs at the step 87. In one embodiment, the system 10 receives the user's selection after the user selects an option or link 87*a* and 87*b* associated with viewing the existing damage logs, as shown in FIG. 4.

As shown in FIG. 3C, before, during, or after the step 87, the system 10 outputs existing damage logs at the step 88. In an exemplary embodiment, to output existing damage logs in the step 88, a program such as, for example, a web browser, is executed by the processor 30*b* of the remote user device 30, thereby causing the web browser to access a website hosted by the functional module 14, the website provides access to, and graphically communicates, the data stored in the database 25. As a result, in the step 88, the existing damage logs are output to the output device 30*d* of the remote user device 30. In some embodiments, the system 10 outputs the existing damage logs in a graphical view 88*a* and/or in a list view 88*b* on the output device 30*d*. In an exemplary embodiment, the output device 30*d* includes a graphical display such as a monitor, and the existing damage logs are displayed on the graphical display in the step 88.

Figure 6:
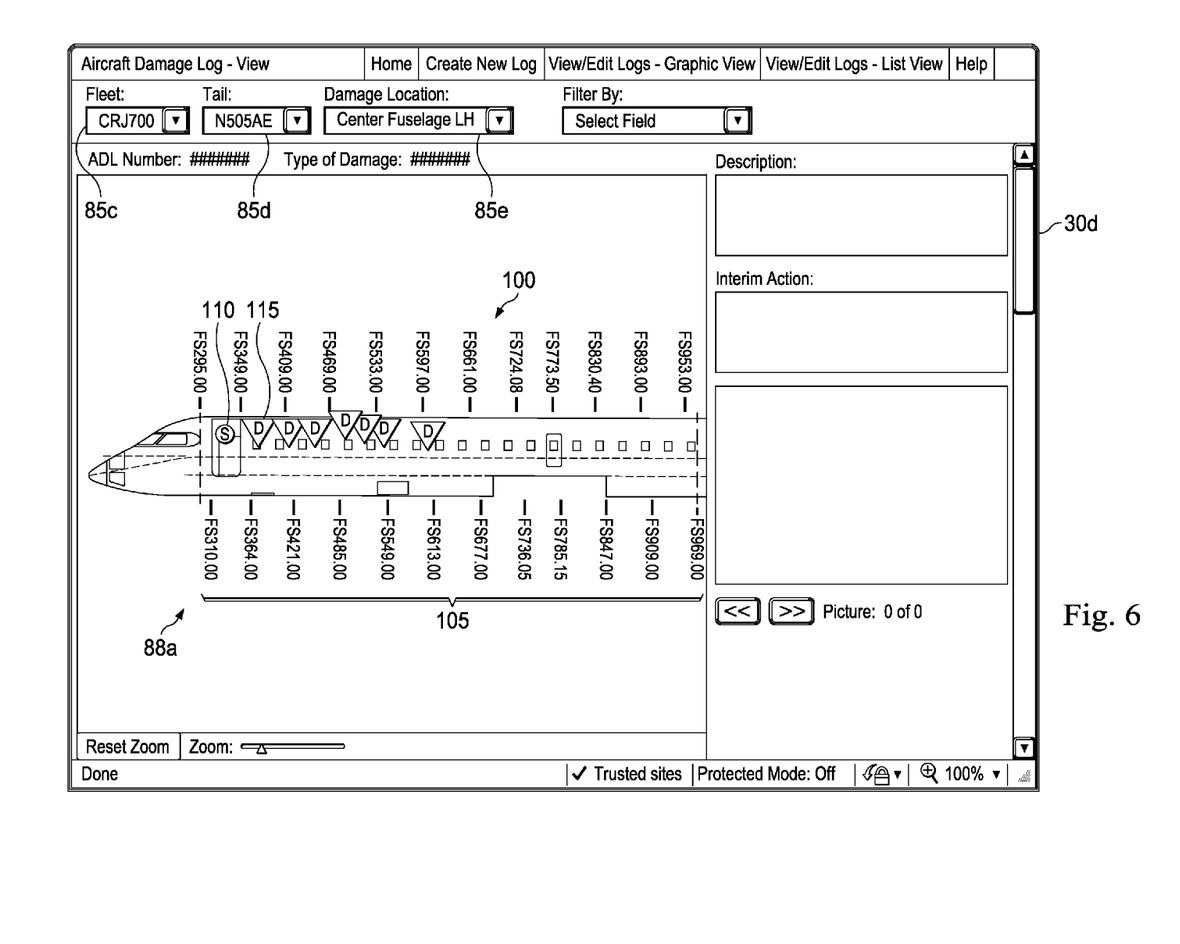

As shown in FIG. 6, and in one embodiment, outputting the existing damage logs in the graphical view 88*a* includes outputting a graphical representation of a portion 100 of the selected aircraft, such as the randome, the forward fuselage, the center fuselage, the wing, the winglet, the rear fuselage, the tail cone, the silencer, the pylon, the engine intake, the nacelle, the vertical stabilizer, and the horizontal stabilizer. In one embodiment, the graphical representation of the portion 100 of the selected aircraft includes a representation of an exterior view of the portion 100 of the selected aircraft and a representation of at least one structural component associated with the portion 100 of the aircraft. In one embodiment, the portion 100 of the selected aircraft is labeled with a plurality of sub-portions 105. In one embodiment, the plurality of sub-portions 105 is associated with structural components of the portion 100 of the selected aircraft. For example, the plurality of sub-portions 105 may be associated with a rib, a stringer, a beam, a spar, a sweep chord, and a frame. In an exemplary embodiment, graphical damage identifiers 110 and 115, which are associated with existing damage logs, are associated with a specific location on the graphical representation of the portion 100 of the selected aircraft. That is, the graphical damage identifiers 110 and 115 are located, relative to the graphical representation of the portion 100 of the selected aircraft, to indicate a location of the instance of damage and type of the instance of damage on the aircraft.

Figure 7:
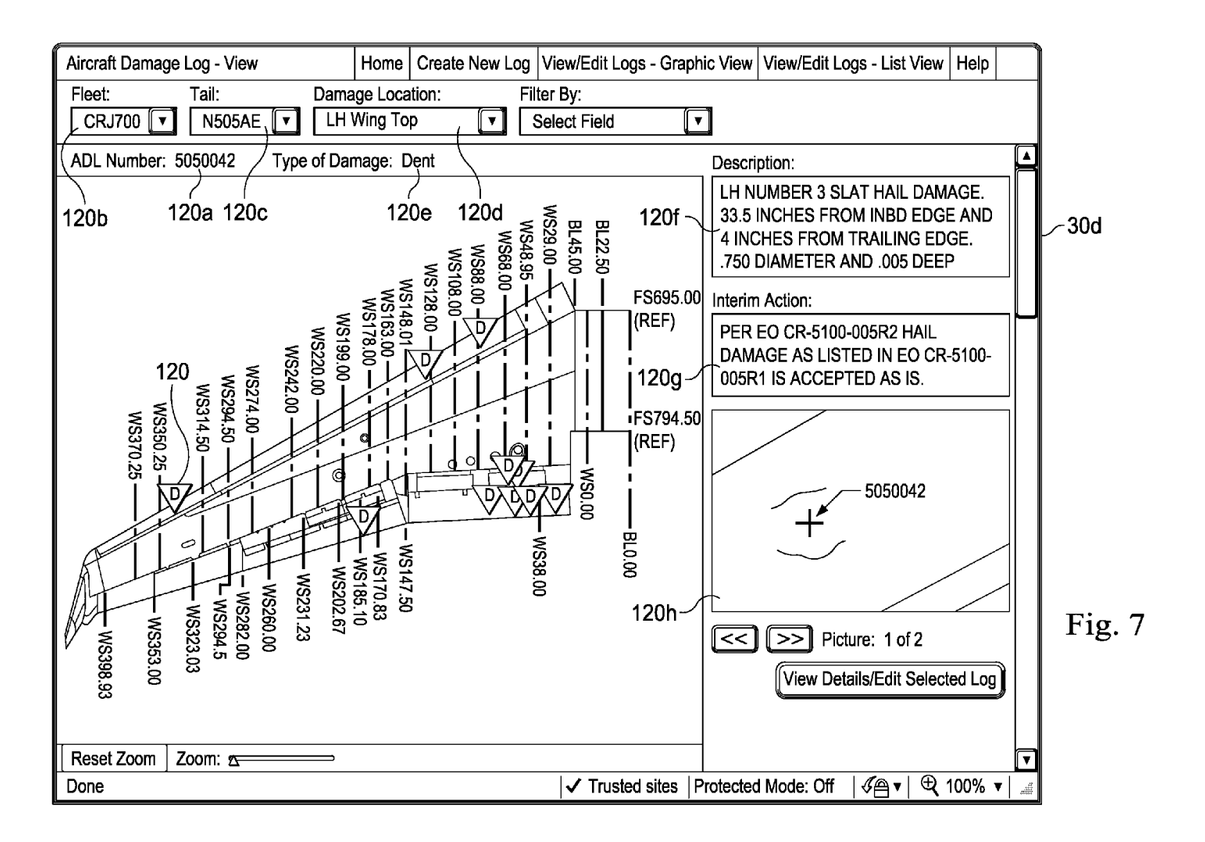

For example, as shown in FIG. 6, the graphical damage indicator, or the graphical damage identifier 110, is located on an aircraft exit, such as a door, of the graphical representation of the selected aircraft, having a tail number of N505AE. Therefore, and in one embodiment, an instance of damage that is associated with the graphical damage identifier 110 is located on the exit of the aircraft having the tail number N505AE. The graphical damage identifier 110 is located between sub-portions FS349.00 and FS295.00, with FS349.00 and FS295.00 associated with frame 349 and frame 295, respectively. In one embodiment, the graphical damage identifier 110 is associated with a damage log and indicates, or visually represents, the type of damage, such as a scratch, a dent, a crack, a gouge, a puncture, an abrasion, corrosion, or delamination. For example, as shown in FIG. 6, the graphical damage identifier 110 is a circle with a letter "s" within the circle, which indicates that the damage associated with the graphical damage identifier 110 is a scratch. Additionally, in one embodiment as shown in FIG. 6, the graphical damage identifier 115 is a triangle with a letter "d" within the triangle, which indicates that the damage associated with the graphical damage identifier 115 is a dent. In one embodiment, a graphical damage identifier is a circle with a letter "c" within the circle, which indicates that the damage associated with the graphical damage identifier is corrosion. In one embodiment, a graphical damage identifier is a triangle with a letter "g" within the circle, which indicates that the damage associated with the graphical damage identifier is a gouge. In one embodiment, a graphical damage identifier is a circle with a letter "p" within the circle, which indicates that the damage associated with the graphical damage identifier is a puncture. In one embodiment, a graphical damage identifier is a rectangle containing a plurality of circles within the rectangle, which indicates that the damage associated with the graphical damage identifier is an abrasion. In one embodiment, a graphical damage identifier is a rectangle containing a plurality of line segments within the rectangle, which indicates that the damage associated with the graphical damage identifier is a crack. In one embodiment, a graphical damage identifier is a triangle, with or without a letter within the triangle, which indicates that the damage associated with the graphical damage identifier is delamination. In one embodiment, the graphical damage identifiers can be associated with colors to identify the type of damage associated with the graphical damage identifier. In another exemplary embodiment, and as shown in FIG. 7, a graphical damage identifier 120 is associated with a damage log having the following data or parameters: the aircraft damage log data or parameters, such as a damage log number 120*a* of 5050042, a fleet number 120*b* of CRJ700, an aircraft tail number 120*c* of N505AE, a station (not shown in FIG. 7); the damage data or parameters, such as a damage location 120*d* of LH Wing top, the type of damage 120*e* of "dent," description of the damage 120*f,* including dimensions of the damage; the interim action data or parameters, such as an interim action description 120*g,* an employee name and employee number associated with the interim action (not shown in FIG. 7), date associated with the interim action (not shown in FIG. 7), and station associated with the interim action (not shown in FIG. 7); the permanent repair data or parameters, such as permanent repair description (not shown in FIG. 7), an employee name and number associated with the permanent repair data (not shown in FIG. 7), date associated with the permanent repair (not shown in FIG. 7), and station associated with the permanent repair (not shown in FIG. 7); work order data (not shown in FIG. 7); reference document data (not shown in FIG. 7); and picture or photograph 120*h* of the instance of damage.

Figure 8:
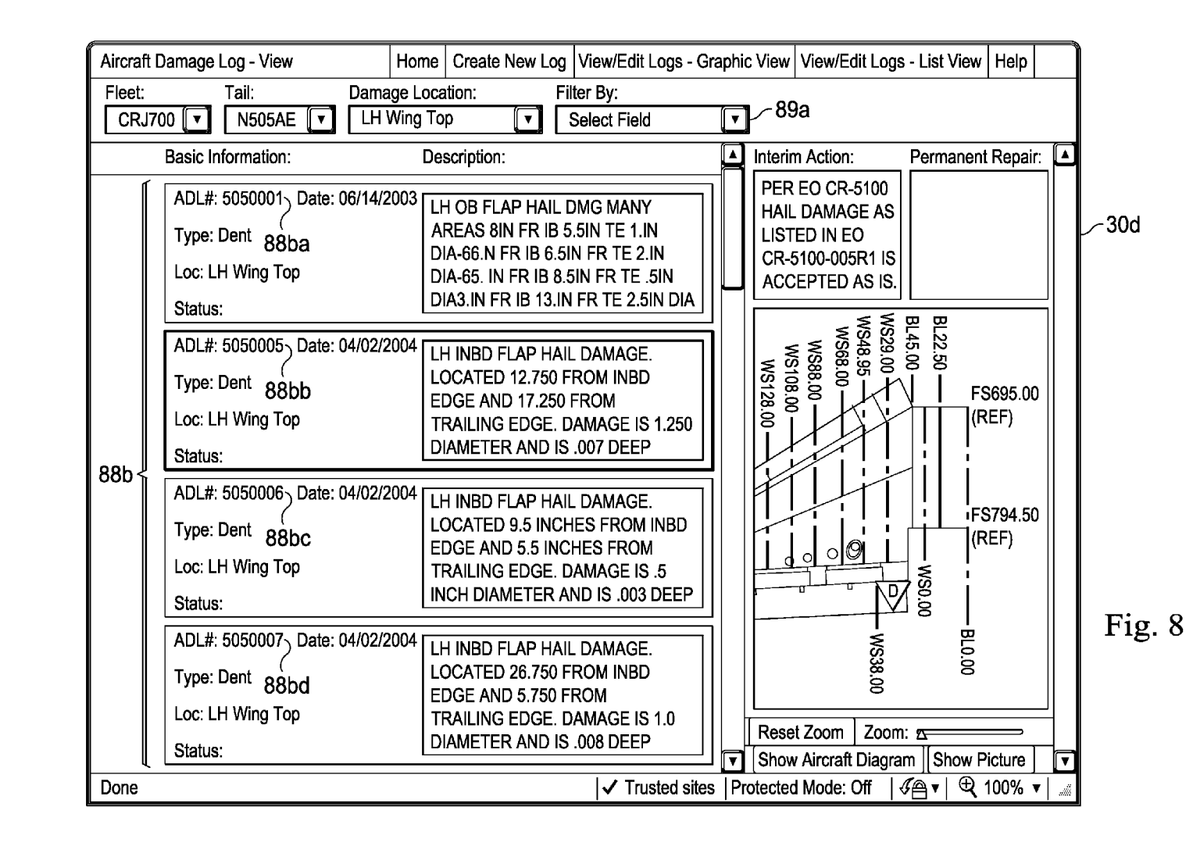

As shown in FIG. 8, and in one embodiment, the system 10 outputs the existing damage logs in a list view 88*b* at the step 88. In one embodiment, the list view 88*b* can include a textual summary of each existing damage log. In one embodiment, the list view 88*b* can be sorted by a damage log number 88*ba*, 88*bb*, 88*bc*, and 88*bd*. In one embodiment, the system 10 outputs a list of existing damage logs.

Referring back to FIG. 3C, before, during or after the step 88, the system 10 receives the user's selection directed to a filter parameter at the step 89. In one embodiment, the user selects the filter parameter from a plurality of filter parameters using a "drop-down" menu 89*a*. In one embodiment, the plurality of filter parameters include: a type of reference document that authorizes the action item; a work order number; a damage description; an action item; an action item status, or repair status, such as "completed" or "not completed;" or by type of damage, such as abrasion, buckling, burn, corrosion, crack, crease, delamination, dent, gouge, nick, puncture, scratch, etc. In one embodiment, an action item status is associated with a status of an action item.

Before, during or after the step 89, the system 10 filters the existing damage logs at the step 90. In one embodiment, the system 10 uses the filter parameter selection received at the step 88 to filter the existing damage logs. In one embodiment, filtering the existing damage logs includes outputting existing damage logs that share the same filter parameter received at the step 88 and that are associated with the portion of the selected aircraft. That is, if the user selected a repair status of "completed" as the filter parameter, the existing damage logs having a repair status of "completed" that are associated with of the portion of the selected aircraft would be output on the output device 30*d*.

Before, during or after the step 90, the system 10 receives the user's selection directed to a selected damage log at the step 93. In one embodiment, the user selects a damage log from the list view 88*b* or the graphical view 88*a* using a "point and click" system. That is, the user highlights or otherwise selects a link associated with a specific damage log to designate that the highlighted or otherwise selected damage log is the selected damage log that the user wishes to view.

Before, during or after the step 93, the system 10 outputs the selected damage log at step 95. In one embodiment, the system 10 outputs the selected damage log using the output device 30*d*. In one embodiment, the system 10 outputs the selected damage log at the step 95 in a manner similar to that which the system 10 outputs the created damage log at the step 85.

Before, during or after the step 95, the system receives damage log data associated with the selected damage log at the step 97. In one embodiment, the system 10 receives damage log data associated with the selected damage log at the step 97 in a manner similar to that which the system 10 receives damage log data associated with the created damage log at the step 86. In one embodiment, the system 10 can receive damage log data when a user a highlights or selects, using the output device 30*d*, a location on the graphical representation of the portion 100 of the aircraft. That is, the system 10 can receive data relating to the location of an instance of damage on the selected aircraft when a user highlights or otherwise selects a location on the graphical representation of the portion 100 of the aircraft. In one embodiment, the system 10 can receive damage log data associated with the selected damage log that replaces or updates existing damage log data associated with the selected damage log. That is, the selected damage log may be edited at the step 97.

In one embodiment, and referring back to FIG. 7, the user may change the tail number 120c associated with the selected damage log in order to associate the instance of damage that is associated with the selected damage log with another aircraft. That is, the user may transfer a damage log to another aircraft by changing the tail number 120c.

In an exemplary embodiment, the method 60 may be used to manage instances of damage within a transportation system. In another embodiment, the system 10 may be used to graphically view all instances of damages to a specific portion of an aircraft at one time. In one embodiment, the system 10 may be used to graphically indicate a type of instance of damage on the selected portion 100 of the aircraft.

In one embodiment, outputting a plurality of graphical damage identifiers allows the user to quickly determine, by viewing the output device 30d, the location and type of the instances of damage that are associated with the selected portion 100 of the selected aircraft.

In one embodiment, the system 10 and/or the method 60 may be used to document any instance of damage associated with a vehicle, such as an aircraft. In one embodiment, regulations, such as government regulations, require documentation of all instances of damage to an aircraft. In one embodiment, the use of the system 10 or the implementation of the method 60 complies with the government regulations.

In one embodiment, the system 10 and/or the method 60 may be used to search, filter, and review existing instances of damage on an aircraft.

In one embodiment, the system 10 is capable of outputting a printable list or printable summary of the existing damage logs at the step 88. That is, the user may print a summary or a list of all existing damage logs at the step 88.

In another embodiment, outputting the existing damage logs in the graphical view 88a includes outputting a graphical representation of multiple portions of the selected aircraft or a front view, a back view, a top view, a bottom view, a right side view, a left side view or any perspective view of the selected aircraft. In another embodiment, outputting the existing damage logs in the graphical view 88a includes outputting a graphical representation of the entire selected aircraft.

In one embodiment, the system 10 may receive the user selections through a variety of methods and is not limited to the drop-down menus 70a, 75a, 80a, selection boxes, links 87a and 87b, and the entry fields 85a-85s. The system 10 may receive user selections in any manner. For example, the system 10 may receive user selections through voice-recognition software, or any other type of software. The system 10 may receive any computer-generated signal corresponding to a user's selection.

Figure 9:
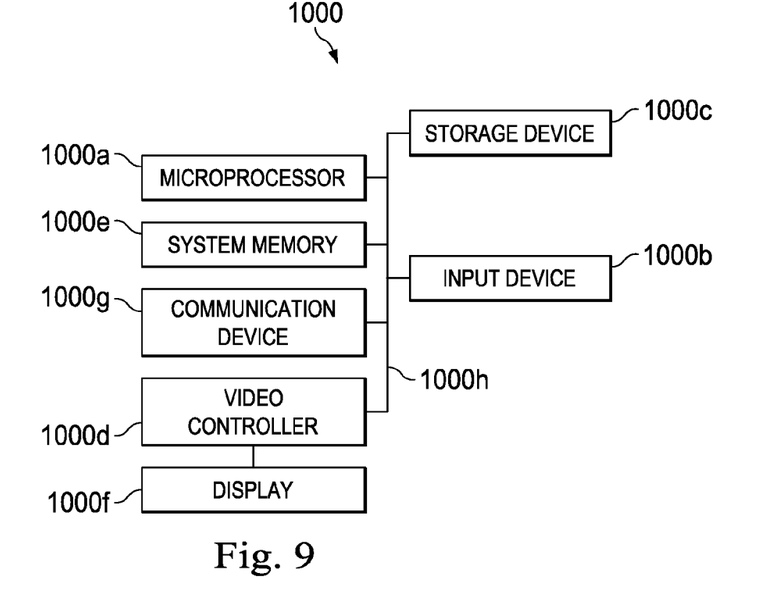
FIG. 9 is a diagrammatic illustration of a computing device for implementing one or more exemplary embodiments of the present disclosure, according to an exemplary embodiment.

In an exemplary embodiment, as illustrated in FIG. 9 with continuing reference to FIGS. 1-8, an illustrative computing device 1000 for implementing one or more embodiments of one or more of the above-described networks, elements, methods and/or steps, and/or any combination thereof, is depicted. The computing device 1000 includes a processor 1000a, an input device 1000b, a storage device 1000c, a video controller 1000d, a system memory 1000e, a display 1000f, and a communication device 1000g, all of which are interconnected by one or more buses 1000h. In several exemplary embodiments, the storage device 1000c may include a floppy drive, hard drive, CD-ROM, optical drive, any other form of storage device and/or any combination thereof. In several exemplary embodiments, the storage device 1000c may include, and/or be capable of receiving, a floppy disk, CD-ROM, DVD-ROM, or any other form of computer readable medium that may contain executable instructions. In several exemplary embodiments, the communication device 1000g may include a modem, network card, or any other device to enable the computing device 1000 to communicate with other computing devices. In several exemplary embodiments, any computing device represents a plurality of interconnected (whether by intranet or Internet) computer systems, including without limitation, personal computers, mainframes, PDAs, smartphones and cell phones.

In several exemplary embodiments, one or more of the functional module 14, the computer processor 15, the computer readable medium 20, the database 25, the remote user device 30, and/or one or more components thereof, are, or at least include, the computing device 1000 and/or components thereof, and/or one or more computing devices that are substantially similar to the computing device 1000 and/or components thereof. In several exemplary embodiments, one or more of the above-described components of one or more of the computing device 1000, the functional module 14, the computer processor 15, the computer readable medium 20, the database 25, and/or one or more components thereof, include respective pluralities of same components.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a computing device such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, the network 35, and/or one or more portions thereof, may be designed to work on any specific architecture. In an exemplary embodiment, one or more portions of the network 35 may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, DBase II, SharePoint, or MySQL, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, a computer program, such as a plurality of instructions stored on a computer readable medium, such as the computer readable medium 20, the system memory 1000e, and/or any combination thereof, may be executed by a processor to cause the processor to carry out or implement in whole or in part the operation of the system 10, the method 60, and/or any combination thereof. In several exemplary embodiments, such a processor may include one or more of the computer processor 15, the processor 1000a, and/or any combination thereof. In several exemplary embodiments, such a processor may execute the plurality of instructions in connection with a virtual computer system.

A method has been described that includes receiving, using at least one computer, data associated with a damage log, the damage log being associated with an instance of damage to a portion of an aircraft, the portion of the aircraft being one of: a randome, a forward fuselage, a center fuselage, a wing, a winglet, a rear fuselage, a tail cone, a silencer, a pylon, an engine intake, a nacelle, a vertical stabilizer, and a horizontal stabilizer; outputting, using at least one computer, a graphical representation of the portion of the aircraft; and outputting, using at least one computer, a graphical damage indicator; wherein the graphical damage indicator is located, relative to the graphical representation of the portion of the aircraft, to indicate a location of the instance of damage on the portion of the aircraft; and wherein the graphical damage indicator visually represents a type of damage to the aircraft. In one aspect, the type of damage is selected from the group consisting of an abrasion, buckling, a burn, corrosion, a crack, a crease, delamination, a dent, a gouge, a nick, a puncture, and a scratch. In another aspect, the graphical representation includes: a representation of an exterior view of the portion of the aircraft; and a representation of at least one structural component associated with the portion of the aircraft. In yet another embodiment, at least one structural component includes at least one of the following: a rib, a stringer, a beam, a spar, a sweep chord, and a frame. In another embodiment, the data associated with the damage log includes data associated with the following: a damage description, the type of damage, an action item, and an action item status. In another embodiment, the damage log includes a photograph of the instance of damage. In yet another embodiment, the method further includes outputting, using the at least one computer, the photograph proximate the graphical representation of the portion of the aircraft. In another embodiment, the method further includes receiving, using the at least one computer, data associated with a plurality of damage logs, each damage log from the plurality of damage logs being associated with one instance of damage located on the portion of the aircraft, wherein the data associated with the first-mentioned damage log is part of the data associated with the plurality of damage logs; and outputting, using the at least one computer, a plurality of graphical damage indicators, each graphical damage indicator being associated with a respective one of the damage logs from the plurality of damage logs and visually representing a type of damage, wherein the first-mentioned graphical damage indicator is part of the plurality of graphical damage indicators. In one embodiment, the data associated with the plurality of damage logs includes, for each of the damage logs, data associated with the following: a damage description, the type of damage, an action item, and an action item status. In yet another embodiment, all of the damage logs in the plurality of damage logs have the same damage description, the same type of damage, the same action item, or the same action item status.

An apparatus has been described that includes a non-transitory computer readable medium; and a plurality of instructions stored on the non-transitory computer readable medium and executable by one or more processors, the plurality of instructions including: instructions that cause the one or more processors to receive data associated with a damage log, the damage log being associated with an instance of damage to a portion of an aircraft, the portion of the aircraft being one of a randome, a forward fuselage, a center fuselage, a wing, a winglet, a rear fuselage, a tail cone, a silencer, a pylon, an engine intake, a nacelle, a vertical stabilizer, and a horizontal stabilizer; instructions that cause the one or more processors to output a graphical representation of the portion of the aircraft; and instructions that cause the one or more processors to output a graphical damage indicator; wherein the graphical damage indicator is located, relative to the graphical representation of the portion of the aircraft, to indicate a location of the instance of damage on the portion of the aircraft; and wherein the graphical damage indicator visually represents a type of damage to the aircraft. In one embodiment, the type of damage is selected from the group consisting of an abrasion, buckling, a burn, corrosion, a crack, a crease, delamination, a dent, a gouge, a nick, a puncture, and a scratch. In another embodiment, the graphical representation includes: a representation of an exterior view of the portion of the aircraft; and a representation of at least one structural component associated with the portion of the aircraft. In another embodiment, at least one structural component includes at least one of the following: a rib, a stringer, a beam, a spar, a sweep chord, and a frame. In another embodiment, the data associated with the damage log includes data associated with the following: a damage description, the type of damage, an action item, and an action item status. In yet another embodiment, the damage log includes a photograph of the instance of damage. In another embodiment, the plurality of instructions further includes instructions that cause the one or more processors output the photograph proximate the graphical representation of the portion of the aircraft. In yet another embodiment, the plurality of instructions further includes instructions that cause the one or more processors to receive data associated with a plurality of damage logs, each damage log from the plurality of damage logs being associated with one instance of damage located on the portion of the aircraft, wherein the data associated with the first-mentioned damage log is part of the data associated with the plurality of damage logs; and instructions that cause the one or more processors to output a plurality of graphical damage indicators, each graphical damage indicator being associated with a respective one of the damage logs from the plurality of damage logs and visually representing a type of damage, wherein the first-mentioned graphical damage indicator is part of the plurality of graphical damage indicators. In yet another embodiment, the data associated with the plurality of damage logs includes, for each of the damage logs, data associated with the following: a damage description, the type of damage, an action item, and an action item status. In one embodiment, all of the damage logs in the plurality of damage logs have the same damage description, the same type of damage, the same action item, or the same action item status.

It is understood that variations may be made in the foregoing without departing from the scope of the present disclosure. For example, instead of, or in addition to transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries, and other industries. In an exemplary embodiment, aspects of the present disclosure are readily applicable and/or readily adaptable to a shipping travel leg in which a ship travels from one port to one or more other ports. In an exemplary embodiment, aspects of the present disclosure are readily applicable and/or readily adaptable to a trucking travel leg during which a truck travels from one city to one or more other cities. In an exemplary embodiment, aspects of the present disclosure are readily applicable and/or readily adaptable to a rail travel leg during which a train travels from one city or station to one or more other cities or stations. In an exemplary embodiment, aspects of the present disclosure are applicable and/or readily adaptable to a wide variety of transportation transactions such as, for example, an airline sequence or itinerary (i.e., a plurality of airline flights), a travel leg of an airline sequence or itinerary (i.e., a single airline flight), an airline block, and/or any combination thereof.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. A method, comprising:
    receiving, using at least one computer, data associated with a damage log, the damage log being associated with an instance of damage to a portion of an aircraft, the portion of the aircraft being one of: a randome, a forward fuselage, a center fuselage, a wing, a winglet, a rear fuselage, a tail cone, a silencer, a pylon, an engine intake, a nacelle, a vertical stabilizer, and a horizontal stabilizer;
    outputting, using the at least one computer, a graphical representation of the portion of the aircraft;
    outputting, using the at least one computer, a graphical damage indicator;
    receiving, using the at least one computer, data associated with a plurality of damage logs, each damage log from the plurality of damage logs being associated with one instance of damage located on the portion of the aircraft, wherein the data associated with the first-mentioned damage log is part of the data associated with the plurality of damage logs; and
    outputting, using the at least one computer, a plurality of graphical damage indicators, each graphical damage indicator being associated with a respective one of the damage logs from the plurality of damage logs and visually representing a type of damage, wherein the first-mentioned graphical damage indicator is part of the plurality of graphical damage indicators;
    wherein the graphical damage indicator is located, relative to the graphical representation of the portion of the aircraft, to indicate a location of the instance of damage on the portion of the aircraft; and
    wherein the graphical damage indicator visually represents a type of damage to the aircraft.

2. The method of claim 1, wherein the data associated with the plurality of damage logs comprises, for each of the damage logs, data associated with the following:
    a damage description, the type of damage, an action item, and an action item status.

3. The method of claim 2, wherein all of the damage logs in the plurality of damage logs have the same damage description, the same type of damage, the same action item, or the same action item status.

4. The method of claim 1,
wherein a first graphical damage indicator in the plurality of graphical damage indicators is associated with a first type of damage and is a first shape; and
wherein a second graphical damage indicator in the plurality of graphical damage indicators is associated with a second type of damage that is different from the first type of damage and is a second shape that is different from the first shape.

5. The method of claim 1, wherein the type of damage is selected from the group consisting of an abrasion, buckling, a burn, corrosion, a crack, a crease, delamination, a dent, a gouge, a nick, a puncture, and a scratch.

6. The method of claim 1, wherein the graphical representation comprises:
a representation of an exterior view of the portion of the aircraft; and
a representation of at least one structural component associated with the portion of the aircraft.

7. The method of claim 6, wherein the at least one structural component comprises at least one of the following: a rib, a stringer, a beam, a spar, a sweep chord, and a frame.

8. The method of claim 1, wherein the data associated with the damage log comprises data associated with the following: a damage description, the type of damage, an action item, and an action item status.

9. The method of claim 1, wherein the damage log comprises a photograph of the instance of damage.

10. The method of claim 9, further comprising outputting, using the at least one computer, the photograph proximate the graphical representation of the portion of the aircraft.

11. An apparatus comprising:
a non-transitory computer readable medium; and
a plurality of instructions stored on the non-transitory computer readable medium and executable by one or more processors, the plurality of instructions comprising:
instructions that cause the one or more processors to receive data associated with a damage log, the damage log being associated with an instance of damage to a portion of an aircraft, the portion of the aircraft being one of: a randome, a forward fuselage, a center fuselage, a wing, a winglet, a rear fuselage, a tail cone, a silencer, a pylon, an engine intake, a nacelle, a vertical stabilizer, and a horizontal stabilizer;
instructions that cause the one or more processors to output a graphical representation of the portion of the aircraft;
instructions that cause the one or more processors to output a graphical damage indicator;
instructions that cause the one or more processors to receive data associated with a plurality of damage logs, each damage log from the plurality of damage logs being associated with one instance of damage located on the portion of the aircraft, wherein the data associated with the first-mentioned damage log is part of the data associated with the plurality of damage logs; and
instructions that cause the one or more processors to output a plurality of graphical damage indicators, each graphical damage indicator being associated with a respective one of the damage logs from the plurality of damage logs and visually representing a type of damage, wherein the first-mentioned graphical damage indicator is part of the plurality of graphical damage indicators;
wherein the graphical damage indicator is located, relative to the graphical representation of the portion of the aircraft, to indicate a location of the instance of damage on the portion of the aircraft; and
wherein the graphical damage indicator visually represents a type of damage to the aircraft.

12. The apparatus of claim 11, wherein the data associated with the plurality of damage logs comprises, for each of the damage logs, data associated with the following:
a damage description, the type of damage, an action item, and an action item status.

13. The apparatus of claim 12, wherein all of the damage logs in the plurality of damage logs have the same damage description, the same type of damage, the same action item, or the same action item status.

14. The apparatus of claim 11,
wherein a first graphical damage indicator in the plurality of graphical damage indicators is associated with a first type of damage and is a first shape; and
wherein a second graphical damage indicator in the plurality of graphical damage indicators is associated with a second type of damage that is different from the first type of damage and is a second shape that is different from the first shape.

15. The apparatus of claim 11, wherein the type of damage is selected from the group consisting of an abrasion, buckling, a burn, corrosion, a crack, a crease, delamination, a dent, a gouge, a nick, a puncture, and a scratch.

16. The apparatus of claim 11, wherein the graphical representation comprises:
a representation of an exterior view of the portion of the aircraft; and
a representation of at least one structural component associated with the portion of the aircraft.

17. The apparatus of claim 16, wherein the at least one structural component comprises at least one of the following: a rib, a stringer, a beam, a spar, a sweep chord, and a frame.

18. The apparatus of claim 11, wherein the data associated with the damage log comprises data associated with the following: a damage description, the type of damage, an action item, and an action item status.

19. The apparatus of claim 11, wherein the damage log comprises a photograph of the instance of damage.

20. The apparatus of claim 19, wherein the plurality of instructions further comprises:
instructions that cause the one or more processors to output the photograph proximate the graphical representation of the portion of the aircraft.

* * * * *